US008923309B2

(12) United States Patent  (10) Patent No.: US 8,923,309 B2
Shah  (45) Date of Patent: Dec. 30, 2014

(54) MANAGING ACCESS GATEWAYS

(75) Inventor: Mehul Jayant Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 587 days.

(21) Appl. No.: 12/770,574

(22) Filed: Apr. 29, 2010

(65) Prior Publication Data

US 2012/0195294 A1 Aug. 2, 2012

(51) Int. Cl.
*H04L 12/28* (2006.01)
*H04W 8/06* (2009.01)
*H04L 12/24* (2006.01)
*H04L 12/56* (2006.01)
*H04W 88/16* (2009.01)
*H04W 76/02* (2009.01)

(52) U.S. Cl.
CPC .............. *H04W 8/065* (2013.01); *H04W 88/16* (2013.01); *H04L 41/0806* (2013.01); *H04L 41/0816* (2013.01); *H04W 76/022* (2013.01)
USPC .......................................... 370/401; 370/411

(58) Field of Classification Search
None
See application file for complete search history.

(56) References Cited

U.S. PATENT DOCUMENTS

| 6,067,452 | A  | * | 5/2000 | Alexander ..................... 455/428 |
| 6,563,919 | B1 | * | 5/2003 | Aravamudhan et al. ...... 379/230 |
| 6,600,738 | B1 | * | 7/2003 | Alperovich et al. ........... 370/352 |
| 6,788,676 | B2 |   | 9/2004 | Partanen et al. |
| 7,702,346 | B2 |   | 4/2010 | Choksi |
| 8,000,689 | B2 |   | 8/2011 | Featherstone et al. |
| 2004/0187021 | A1 | | 9/2004 | Rasanen |
| 2004/0199667 | A1 | | 10/2004 | Dobbins |
| 2005/0182829 | A1 | | 8/2005 | King et al. |
| 2006/0018291 | A1 | | 1/2006 | Patel et al. |
| 2006/0028998 | A1 | | 2/2006 | Lioy et al. |
| 2006/0077924 | A1 | | 4/2006 | Rune |
| 2006/0085543 | A1 | | 4/2006 | Hrastar et al. |
| 2006/0104262 | A1 | | 5/2006 | Kant et al. |
| 2006/0117020 | A1 | | 6/2006 | Toebes et al. |
| 2007/0030973 | A1 | | 2/2007 | Mikan |
| 2007/0060100 | A1 | | 3/2007 | Watler et al. |
| 2007/0097997 | A1 | | 5/2007 | Maclean et al. |
| 2007/0115934 | A1 | | 5/2007 | Dauster et al. |
| 2007/0274255 | A1 | | 11/2007 | Hung et al. |
| 2008/0005561 | A1 | | 1/2008 | Brown et al. |

(Continued)

FOREIGN PATENT DOCUMENTS

KR    10-2006-0022937 A    3/2006
WO    WO 03/084185 A1      10/2003
WO    WO 2009/022750 A2    2/2009

OTHER PUBLICATIONS

3GPP TS 23.401 (V8.0.0, Dec. 2007, pp. 42, 102, 119).*

(Continued)

*Primary Examiner* — Eunsook Choi
(74) *Attorney, Agent, or Firm* — Knobbe, Martens, Olson & Bear, LLP

(57) ABSTRACT

Systems and methods for the management of communications related to telecommunications-based devices are provided. Gateway computing devices corresponding to a radio communication network can modify the static provisioning of communication network access gateway to telecommunications-based devices accessing the wireless communication network. The modification of the static provisioning of gateway devices is based on subscription information associated with the requesting telecommunications-based device or based on general network policies that can be dynamically updated.

29 Claims, 10 Drawing Sheets

(56) References Cited

U.S. PATENT DOCUMENTS

| | | | |
|---|---|---|---|
| 2008/0160972 A1 | 7/2008 | Haran et al. | |
| 2008/0305779 A1 | 12/2008 | Wright et al. | |
| 2008/0311885 A1 | 12/2008 | Dawson et al. | |
| 2009/0034512 A1* | 2/2009 | Bantukul et al. | 370/352 |
| 2009/0037595 A1 | 2/2009 | Breau et al. | |
| 2009/0047947 A1 | 2/2009 | Giaretta et al. | |
| 2009/0086705 A1* | 4/2009 | Zisimopoulos et al. | 370/347 |
| 2009/0161575 A1* | 6/2009 | Zhao et al. | 370/254 |
| 2009/0298478 A1 | 12/2009 | Tyhurst et al. | |
| 2009/0305671 A1 | 12/2009 | Luft et al. | |
| 2010/0020685 A1 | 1/2010 | Short et al. | |
| 2010/0027448 A1 | 2/2010 | Puthiyandyil | |
| 2010/0095317 A1 | 4/2010 | Toebes et al. | |
| 2010/0234025 A1* | 9/2010 | Julka | 455/436 |
| 2010/0284278 A1* | 11/2010 | Alanara | 370/235 |
| 2011/0106946 A1 | 5/2011 | Bao et al. | |

OTHER PUBLICATIONS

3rd Generation Partnership Project (3GPP); Technical Specification Group Services and System Aspects; Feasibility Study for Transport and Control Separation in the PS CN Domain (Release 4), Technical Report 3GPP TR 23.873 V.4.0.0, Mar. 2001, Valbonne, France.

3rd Generation Partnership Project; Technical Specification Group Core Network and Terminals; IP Multimedia (IM) Session Handling; IM Call Model; Stage 2 (Release 8), Technical Specification 3GPP TS 23.218 V8.4.0, Dec. 2008, Valbonne, France.

3rd Generation Partnership Project; Technical Specification Group Core Network and Terminals; Numbering, Addressing and Identification (Release 8), Technical Specification 3GPP TS 23.003 V8.2.0, Sep. 2008, Valbonne, France.

3rd Generation Partnership Project; Technical Specification Group Core Network and Terminals; Signalling Flows for the IP Multimedia Call Control Based on Session Initiation Protocol (SIP and Session Description Protocol (SDP); Stage 3 (Release 5), 3GPP TS 24.228 V5.15.0, Sep. 2006.

3rd Generation Partnership Project; Technical Specification Group Services and System Aspects; General Packet Radio Service (GPRS) Enhancements for Evolved Universal Terrestrial Radio Access Network (E-UTRAN) Access (Release 8), Technical Specification 3GPP TS 23.401 V8.3.0, Sep. 2008, Valbonne, France.

3rd Generation Partnership Project; Technical Specification Group Services and System Aspects; Internet Protocol (IP) based IP Multimedia Subsystem (IMS) Emergency Sessions (Release 7), Technical Report 3GPP TR 23.867 V7.1.0, Dec. 2005, Valbonne, France.

3rd Generation Partnership-Project; Technical Specification Group Services and System Aspects; IP Multimedia Subsystem (IMS); Stage 2 (Release 8), Technical Specification 3GPP TS 23.228 V8.6.0, Sep. 2008, Valbonne, France.

3rd Generation Partnership Project; Technical Specification Group Services and System Aspects; One Tunnel Functional Description (Release 7), Technical Report 3GPP TR 23.809 V1.0.0, Sep. 2006, Valbonne, France.

GPRS Roaming Guidelines, Permanent Reference Document: IR.33, Version 3.2.0, Apr. 3, 2003.

Inter-Service Provider IP Backbone Guideline, Permanent Reference Document: 1R.34, Version 4.2, Oct. 30, 2007.

RFC2766—Network Address Translation-Protocol ; Translation by G. Tsirtsis and P. Srisuresh, Feb. 2000.

* cited by examiner

MANAGING ACCESS GATEWAYS

Generally described, computing devices and communication networks facilitate the collection and exchange of information. Utilizing a communication network and relevant communication protocols, a computing device can engage in data communications with a wide variety of computing devices. Prior to initiating connectivity to the communication network, however, the external computing devices must have some type of agreement with the computing devices associated with communication networks, often referred to as gateway computing devices, as to the specific network computing devices that will be used to facilitate communications.

In accordance with a telecommunications-based environment, telecommunications-based devices, such as mobile terminals, establish communications with gateway computing devices via a wireless communication network. The gateway computing devices provide data communication to data networks, such as the local area network or wide area networks (e.g., the Internet). Typically, a service provider maintains the wireless access communication network and gateway computing device for telecommunications-based devices that are associated with subscribers/customers of the service provider, often referred to as a home network. Additionally, multiple service providers have business relationships that allow telecommunications-based devices that are not associated with subscribers/customer of the particular service provider to use a foreign/visitor radio access network to access other data networks. The non-subscribers telecommunications-based devices are often referred to as roaming telecommunications-based devices from the perspective of the service provider and the wireless communication network are often referred to as visiting networks/foreign networks from the perspective of the non-subscriber telecommunications-based device.

Subscriber telecommunications-based devices are often configured with software applications, configurations, or other settings that may specify which gateway computing devices will be utilized to provide communications. Additionally, the home network service provider are typically configured with static provisioning that assigns different subscriber telecommunications-based devices to specific gateway computing devices associated the home network. However, because of the static in nature of the configuration, the provisioning of gateway computing devices to mobile devices cannot be modified without modification to the software configurations of the mobile device and the gateway computing devices.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Generally described, aspects of the present disclosure relate to the management of communications related to telecommunications-based devices. In an illustrative embodiment, gateway computing devices corresponding to a radio communication network can modify the static provisioning of communication network access gateway to telecommunications-based devices accessing the wireless communication network. In an illustrative embodiment, the modification of the static provisioning of gateway devices is based on subscription information associated with the requesting telecommunications-based device or based on general network policies that can be dynamically updated.

Although aspects of the present disclosure will be described with regard to an illustrative telecommunication environment and component interactions, communication protocols and flow diagrams, one skilled in the relevant art will appreciate that the disclosed embodiments are illustrative in nature and should not be construed as limiting. Specifically, although the present disclosure will be described with regard to the two above-referenced addressing protocols, the systems and methods in the present disclosure may utilized in conjunction with various communication protocols, including additional or different addressing protocols. Additionally, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Still further, although the present disclosure references a telecommunications-based device, one skilled in the relevant art will appreciate that a telecommunications-based device may also be referred to as a wireless computing device, a mobile communication device, a mobile terminal, or a computing device. Examples of telecommunication devices are described below with regard to FIGS. 1A and 1B. Accordingly, reference to a telecommunication device should not be interpreted as including any particular functionality or operation not described in the present disclosure.

Figure 1A:
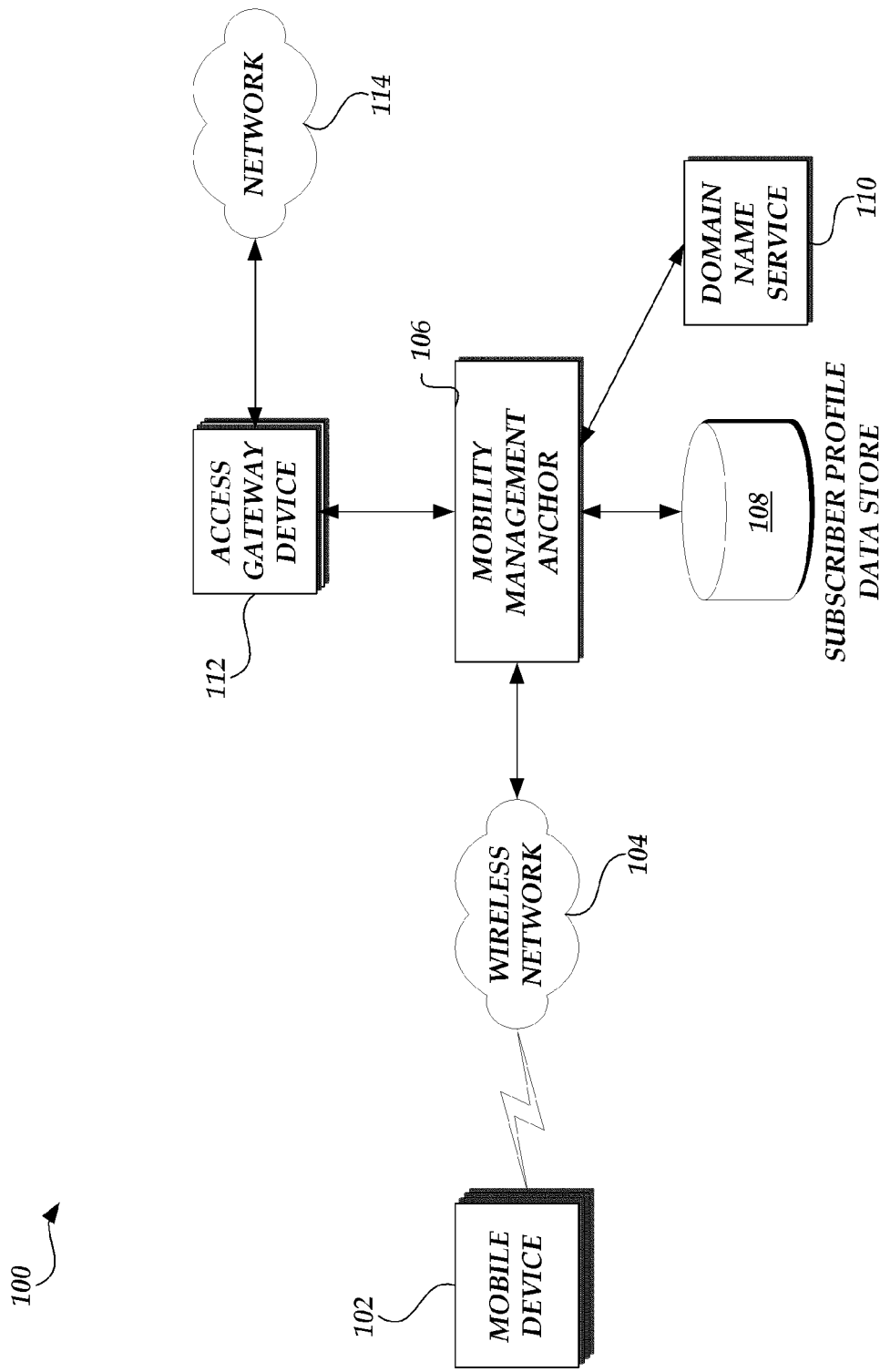
FIGS. 1A and 1B are block diagrams illustrative of a telecommunication environment including a number of telecommunication devices and gateway computing devices.
Figure 1B:
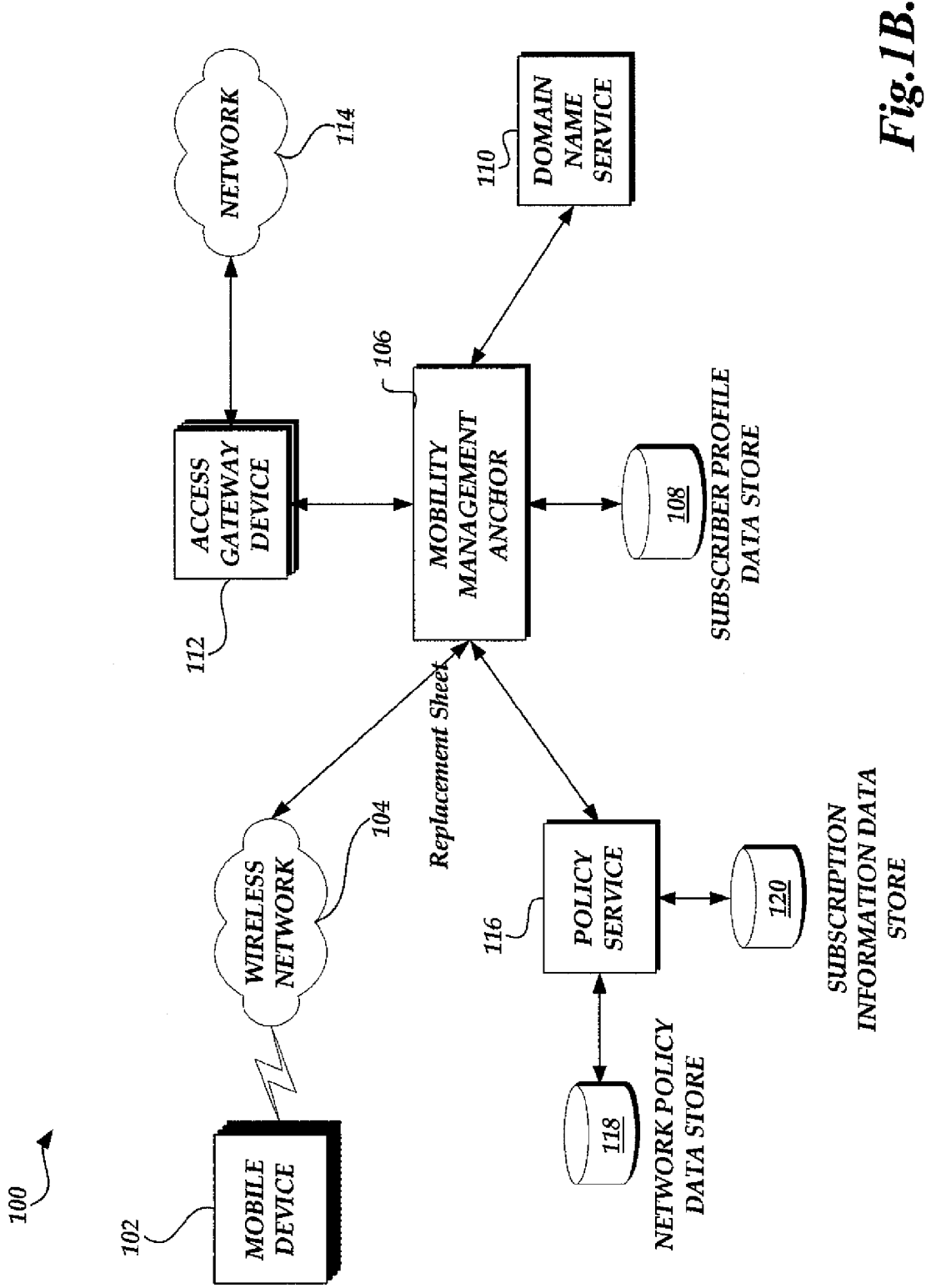

With reference now to FIGS. 1A and 1B two embodiments of an illustrative telecommunication environment 100 will be described. However, the telecommunication environment 100 of FIGS. 1A and 1B will be described separately for purposes of illustration and should not be construed as exclusive. With reference to FIG. 1A, the telecommunication device communication environment 100 can include a number of telecommunications-based device 102 associated with a user. The telecommunications-based device 102 can correspond to a wide variety of devices or components that are capable of initiating, receiving or facilitating communications over a radio communication network 104 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunications-based device 102 include a wide variety of software and hardware components for establishing communications over one or more communication networks, including wireless communication network 104 or a wired communication network (not shown). Illustrative components of a telecommunications-based device 102 will be described in greater detail with regard to FIG. 2.

With continued reference to FIG. 1A, in communication with the telecommunications-based devices 102 are a number of computing devices, generally referred to as gateway computing devices. Specifically, as illustrated in FIG. 1A, the gateway computing devices can include a mobility management anchor computing device 106 for obtaining requests for connectivity to communication networks from telecommunications-based devices 102 via the wireless communication network 104. Illustratively, the mobility management anchor computing device 106 may correspond to a Mobility Management Entity ("MIME") key control node as specified for the Long Term Evolution ("LTE") air interface protocol. In another example, the mobility management anchor computing device 106 may correspond to the Serving GPRS Support Node ("SGSN") node in accordance with the General Packet Radio Service ("GPRS") and Universal Mobile Telecommunications System ("UMTS") air interface protocols. One skilled in the relevant art will appreciate that the mobility management anchor computing device 106 is not limited to any specific structure or component of any one air interface protocol.

As will be discussed in greater detail below, the mobility management anchor computing device 106 can maintain data, such as in the form of data tables, that facilitate the static provisioning of specific gateway computing devices, such as access gateway devices, to telecommunications-based devices 102. The mobility management anchor computing device 106 can also maintain security data that facilitates the authentication and authorization of telecommunications-based devices 102. Specifically, the mobility management anchor computing device 106 can maintain one or more subscriber profile data stores 108 for maintaining the data provisioning gateway computing devices and the security data associated with the telecommunications-based devices 102. The subscriber profile data stores 108 may correspond to a single data store or a set of data stores, maintain either locally or in a distributed manner. Still further, at least some portion of the subscriber profile data stores 108 may correspond to service provider home networks. Also in communication with the mobility management anchor computing device 106 is a domain name service for resolving network address, such as Internet Protocol addresses, for identified gateway computing devices. The telecommunication device communication environment 100 can further include one or more access gateway computing devices 112 that facilitate, or otherwise provider, data connectivity to the communication network 114. Illustrative interactions of telecommunications-based devices 102 with the mobility management anchor computing device 106 utilizing static provisioning of the access gateway devices 112 will be described below with regard to FIGS. 3A and 3B.

Referring now to FIG. 1B, in an illustrative embodiment, the telecommunication device communication environment 100 can include additional components for facilitating the modification of the static provisioning of gateway computing devices to telecommunications-based devices 102. Illustrative, the telecommunication device communication environment 100 illustrated in FIG. 1B also includes all the components discussed above with regard to FIG. 1A. However, one skilled in the relevant art will appreciate that one or more components previously discussed with regard to FIG. 1A may be omitted.

Turning now to FIG. 1B, the additional component included in the telecommunication device communication environment 100 is a policy service 116 in communication with the mobility management anchor computing device 106. The policy service 116 is configured to process context connection requests associated with the static provisioning and submitted by telecommunications-based devices 102 and determine whether such static provisioning should be modified. Specifically, in an illustrative embodiment, the policy server utilizes subscriber information and network policies to determine whether the static provisioning of gateway computing devices should be modified. As illustrated in FIG. 1B, the policy service 116 maintains a network policy data store 118 and subscription information data store 120 utilized in the processing of the context requests. As discussed above with regard to subscriber profile data store 108, the network policy data store 118 and subscription information data store 120 may correspond to a single data store or a set of data stores, maintain either locally or in a distributed manner. Illustrative interactions of telecommunications-based devices 102 with the mobility management anchor computing device 106 and policy service 116 will be described below with regard to FIGS. 4A-4C.

In an illustrative embodiment, the telecommunication device communication environment 100 can include a number of additional components, systems and/or subsystems for facilitating communications with the telecommunications-based devices 102 and/or the mobility management anchor computing device 106, or other devices. The additional components can facilitate wireless communication network 104, such as a cellular radio access network, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 104 are well known and will not be described in greater detail. Additionally, although the wireless communication network 104 is illustrated as a single communication network, one skilled in the relevant art will appreciate that the communication network can be made up of any number of public or private communication networks and/or network connections.

Figure 2:
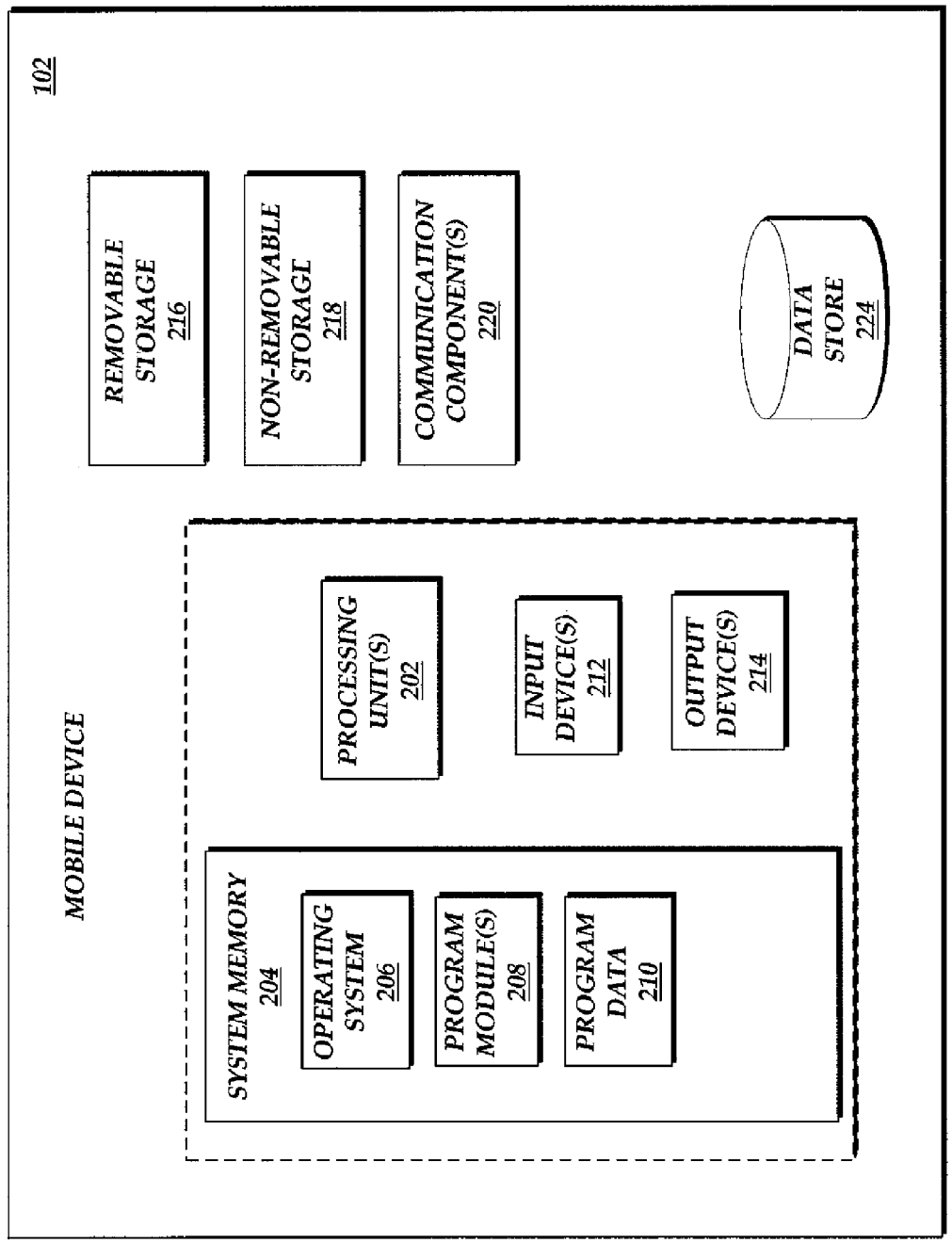
FIG. 2 is a block diagram illustrative of components of a telecommunication device for use the generation, management and display of group-based information.

With reference now to FIG. 2, illustrative components of a telecommunication device, such as telecommunications-based device 102, for use in the creation and display of group-based information displays will be described. The telecommunications-based device 102 may include one or more processing units 202, such as one or more CPUs. The telecommunications-based device 102 may also include system memory 204, which may correspond to any combination of volatile and/or non-volatile storage mechanisms. The system memory 204 may store information which provides an operating system component 206, various program components 208, program data 210, and other components. The above-enumerated list of components is representative and is not exhaustive of the types of functions performed, or components implemented, by the telecommunications-based device 102. One skilled in the relevant art will appreciate that additional or alternative components may also be included in the telecommunications-based device 102 to carry out other intended functions such as a mobile telephone functions. The telecommunications-based device 102 performs functions by using the processing unit(s) 202 to execute instructions provided by the system memory 204. The telecommunications-based device 102 may also include one or more input devices 212 (keyboard, mouse device, specialized selection keys, etc.) and one or more output devices 214 (displays, printers, audio output mechanisms, etc.).

With continued reference to FIG. 2, the telecommunications-based device 102 may also include one or more types of removable storage 216 and one or more types of non-removable storage 218. Still further, the telecommunications-based device 102 can include communication components 220 for facilitating communication via wired and wireless communication networks, such as the wireless communication network 104 and data network 118 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

Figure 3A:
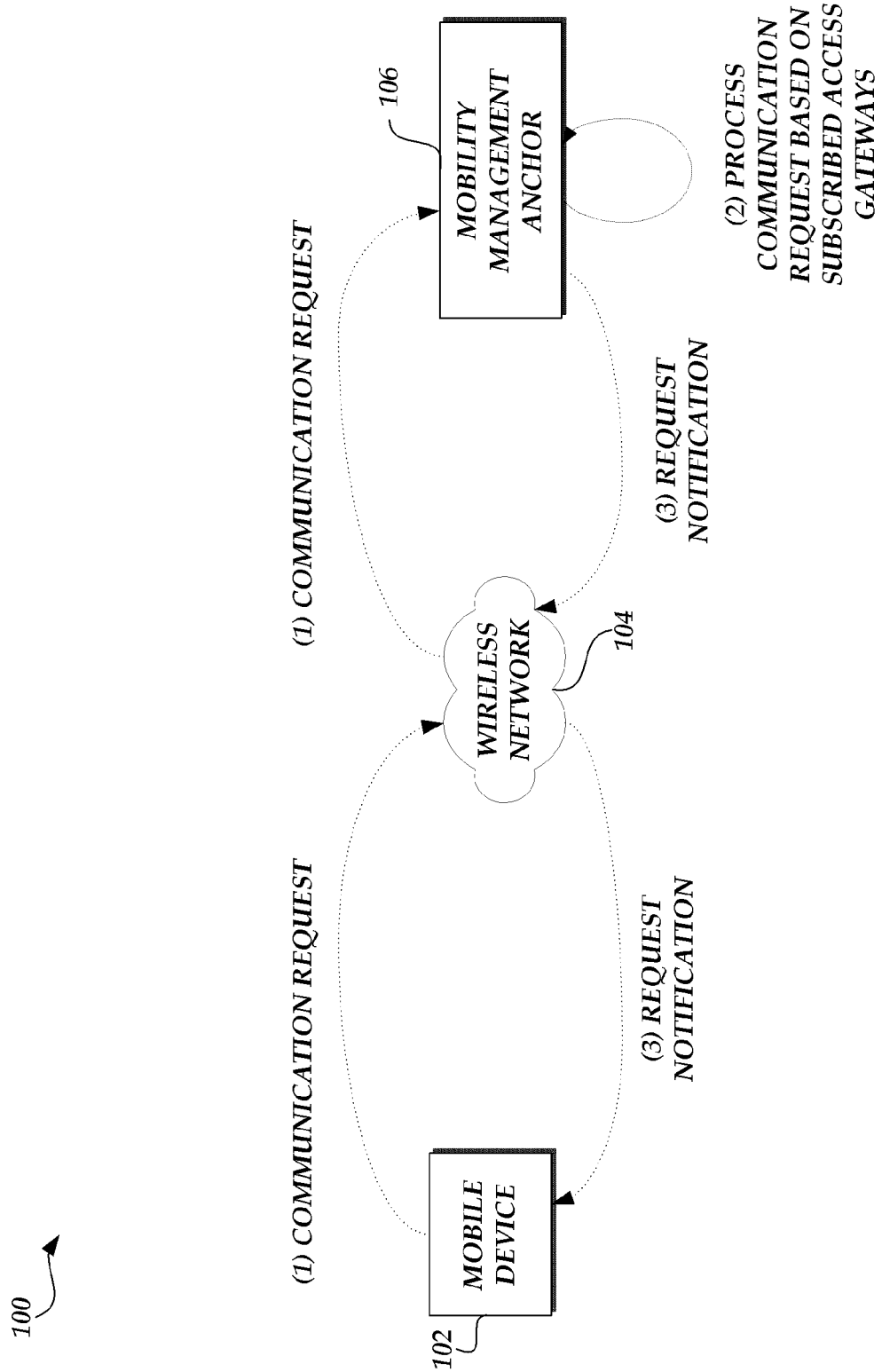
FIGS. 3A and 3B are block diagrams of the telecommunication environment of FIG. 1A illustrating an embodiment for the provisioning of a gateway computing device to a requesting mobile telecommunications-based device.
Figure 3B:
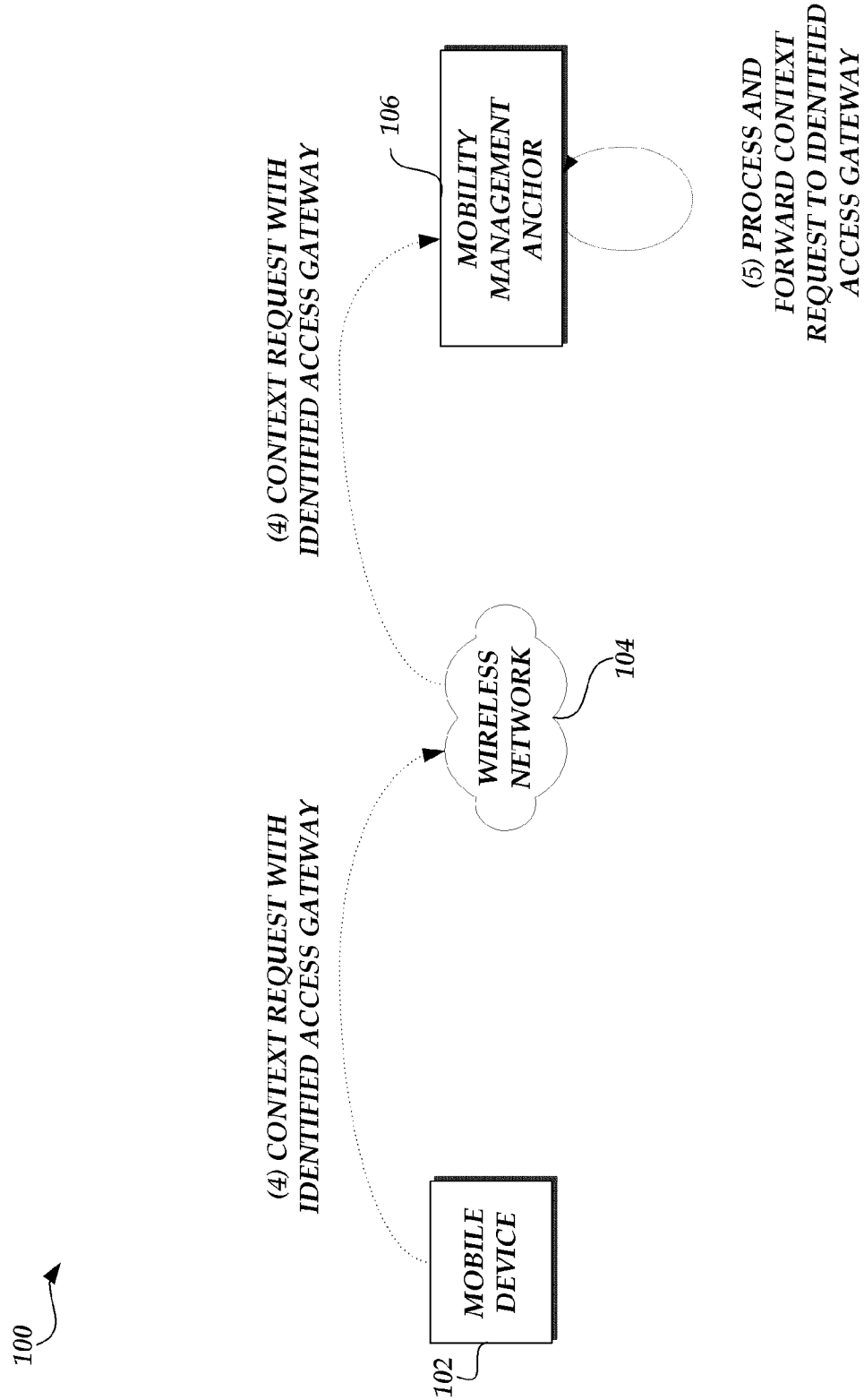

With reference now to FIGS. 3A and 3B, an illustrative example of an embodiment for the establishment of communications via a telecommunications-based device 102 and a gateway computing device, such as the mobility management anchor computing device 106, will be described. With reference to FIG. 3A, in a traditional embodiment, a telecommunications-based device 102 transmits a request to establish communications via the wireless communication network 104. In this traditional embodiment, the request from the telecommunications-based device 102 can correspond to an "Attach Request" transmitted from the telecommunications-based device 102.

Upon receipt of the communication request, the mobility management anchor computing device 106 processes the communication request via information maintained by the subscriber profile data store 108. In one aspect, the subscriber profile data store 108 can provide security information or authentication information utilized by the mobility management anchor computing device 106. In another aspect, the subscriber profile data store 108 can provide the identification of a static list of one or more gateway computing devices, such as access gateway devices 112, that have been previously been associated with the telecommunications-based device 102. The subscription information, including the static list of the one or more gateway computing devices, is maintained by the mobility management anchor computing device 106 for use in processing subsequent communications from the telecommunications-based device 102. For example, the mobility management anchor computing device 106 may verify that any gateway computing devices identified in the communication request match a gateway computing device identified in the static list. The mobility management anchor computing device 106 then transmits a confirmation or rejection notification to the requesting telecommunications-based device 102.

With reference now to FIG. 3B, in the same traditional embodiment, upon receipt of the notification from the mobility management anchor computing device 106, the telecommunications-based device 102 transmits a second communication request to the mobility management anchor computing device 106 to establish a communication context. In this second request, the telecommunications-based device 102 specifies the identity of one of the gateway communication devices identified subscription information or otherwise configured on the telecommunications-based device 102. Illustratively, the telecommunications-based device 102 is configured with information that identifies one or more gateway computing devices that can be requested.

The mobility management anchor computing device 106 processes the context communication request to determine the network address of the appropriate gateway computing device identified in the context request. For example, the mobility management anchor computing device 106 can verify that the requested gateway computing device matches the list of one or more gateway computing devices the telecommunications-based device 102 can request. If the requested gateway computing device is appropriate for the quest, the mobility management anchor computing device 106 can then utilize the domain name service 110 to resolve the IP address of the identified gateway computing device. Once the mobility management anchor computing device 106 obtains the appropriate information, the mobility management anchor computing device forwards the context request to the appropriate gateway computing device to facilitate communications between the gateway computing device and the telecommunications-based device 102. However, as illustrated in FIGS. 3A and 3B, this traditional approach can be inefficient in the static provisioning of the subscription information used to determine an appropriate gateway computing device. Specifically, the static provisioning is not based on user subscription information, network policies and cannot typically be updated without requiring significant updates to the subscriber profile data store 108 and telecommunications-based device 102.

Figure 4A:
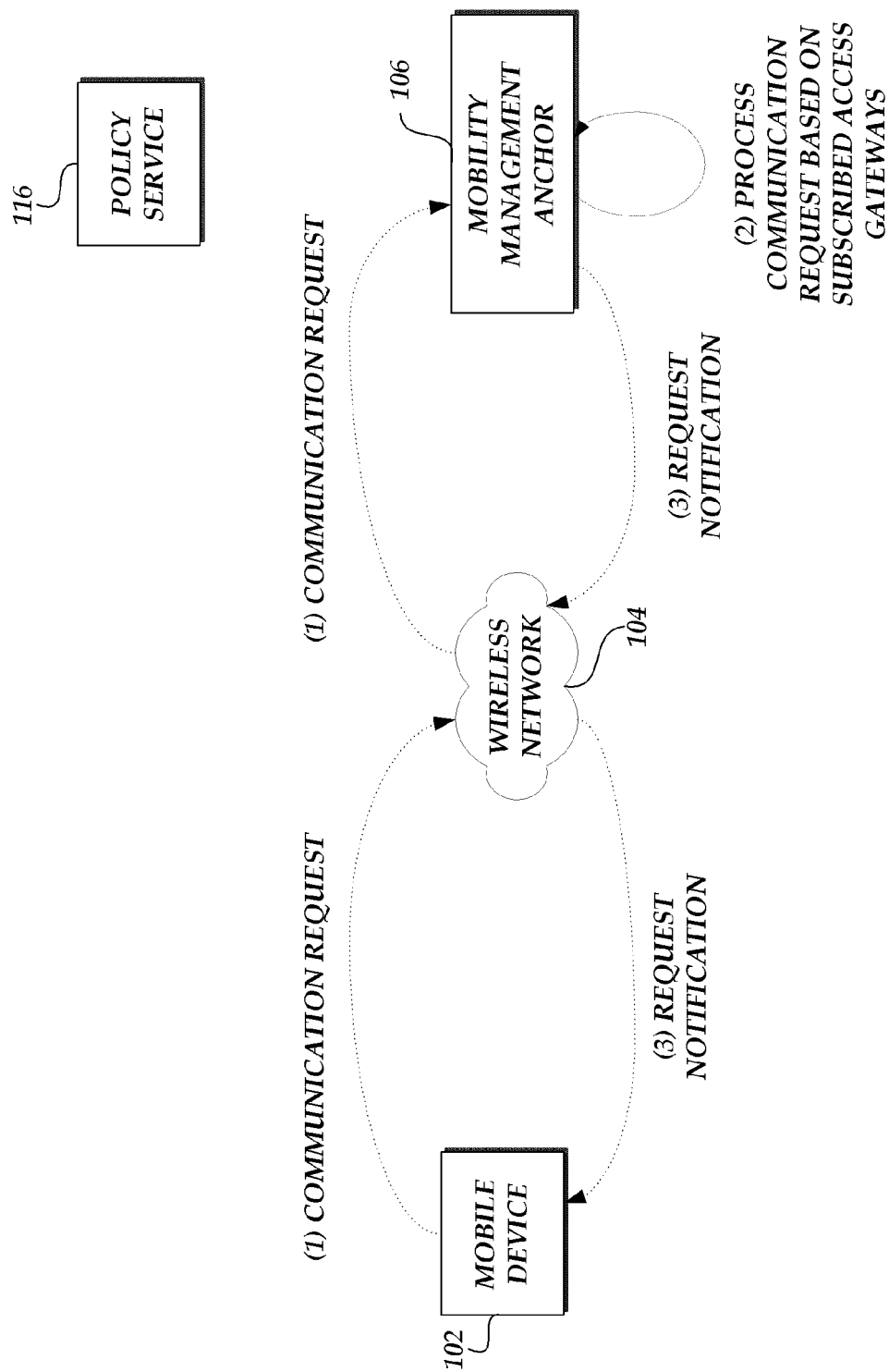
FIGS. 4A-4C are block diagrams of the telecommunication environment of FIG. 1B illustrating another embodiment for the provisioning of a gateway computing device to a requesting mobile telecommunications-based device.
Figure 4B:
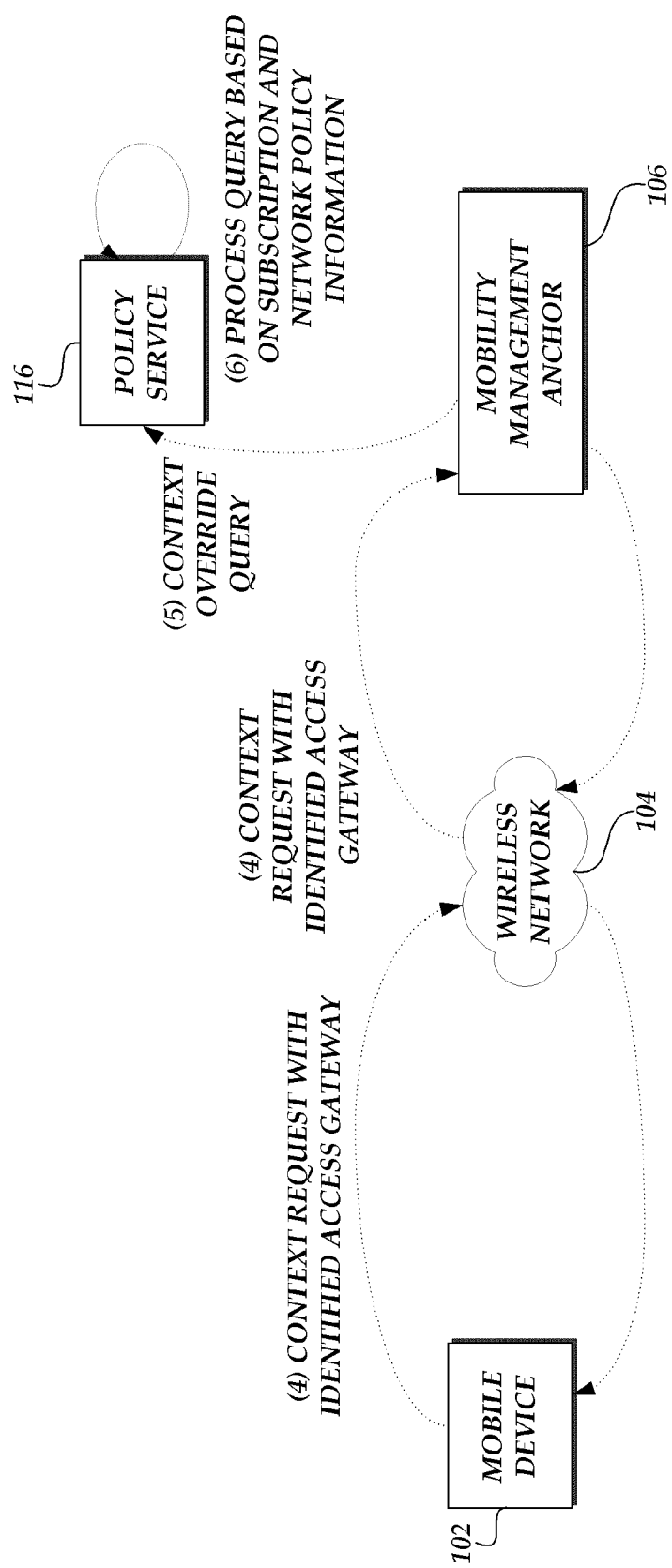
Figure 4C:
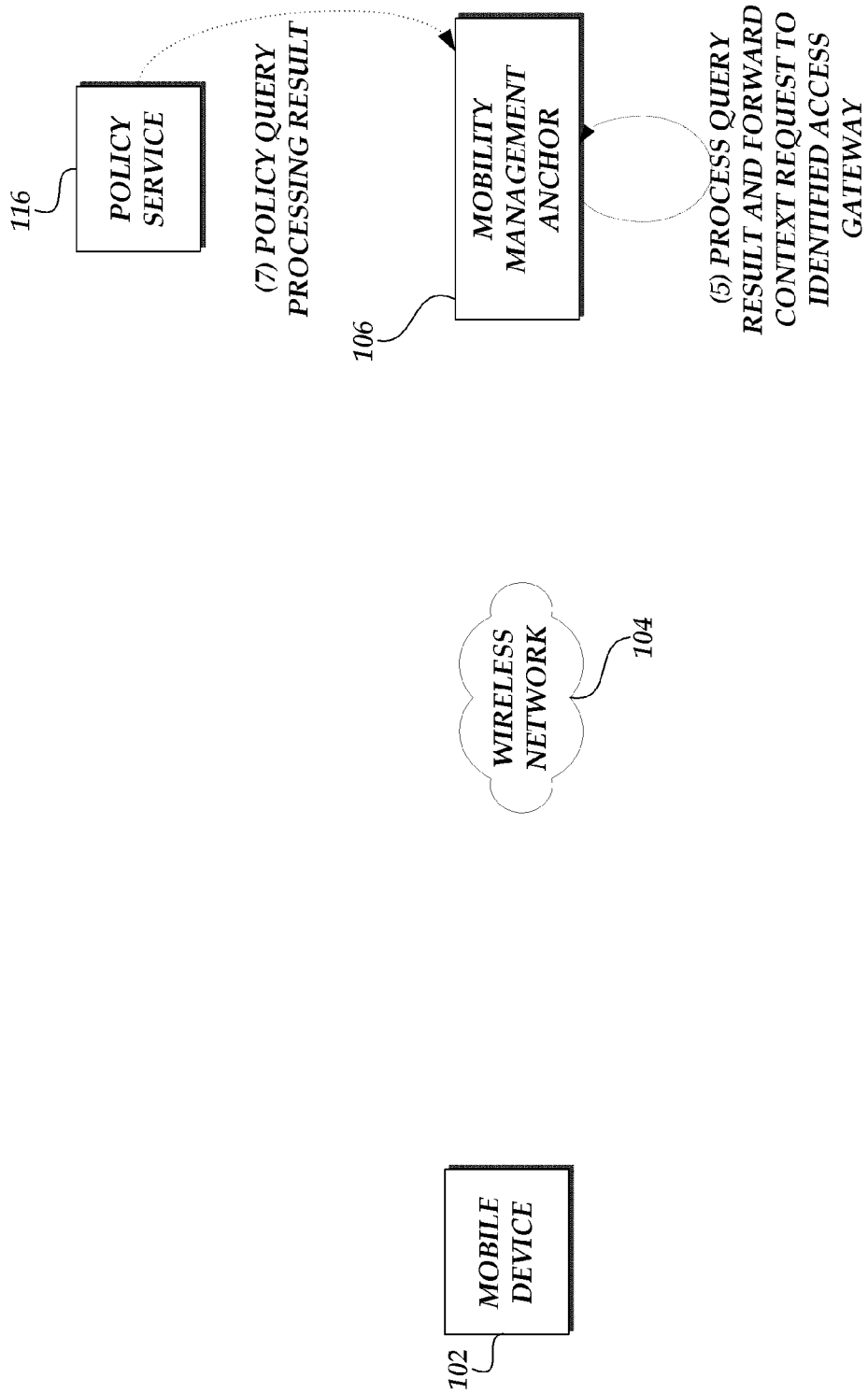

With reference now to FIGS. 4A-4C, an illustrative example of another embodiment for the establishment of communications between a mobile telecommunications-based device 102 and a gateway computing devices, such as the mobility management anchor computing device 106, will be described. With reference to FIG. 4A, similar to the embodiment described with regard to FIG. 3A, a telecommunications-based device 102 transmits a request to establish communications via the wireless communication network 104. Illustratively, the communication request can correspond to an "Attach Request" transmitted from the telecommunications-based device 102 to the mobility management anchor computing device 106.

Upon receipt of the communication request, the mobility management anchor computing device 106 processes the communication request via information maintained by the subscriber profile data store 108. In one aspect, the subscriber profile data store 108 can provide security information or authentication information utilized by the mobility management anchor computing device 106. In another aspect, the subscriber profile data store 108 can provide the identification of a static list of one or more gateway computing devices, such as access gateway devices 112, that have been previously been associated with the telecommunications-based device 102. The subscription information, including the static list of the one or more gateway computing devices, is maintained by the mobility management anchor computing device 106 for use in processing subsequent communications from the telecommunications-based device 102. The mobility management anchor computing device 106 then transmits a confirmation or rejection notification to the requesting telecommunications-based device 102. In an alternative embodiment, the mobility management anchor computing device 106 can also transmit at least a portion of the subscription information, such as a portion of the static list of the one or more gateway computing devices that can be used by the telecommunications-based device 102.

With reference now to FIG. 4B, upon receipt of the notification from the mobility management anchor computing device 106 (and any additional information), the telecommunications-based device 102 transmits a second communication request to the mobility management anchor computing device 106 to establish a communication context. In this second request, the telecommunications-based device 102 can specify the identity of one of the gateway communication devices identified subscription information or otherwise configured on the telecommunications-based device 102. Alternatively, the request can be transmitted without any specified gateway computing device. For example, the provisioning data maintained on the telecommunications-based device 102 can include expiration criteria such that the telecommunications-based device 102 will not transmit communication requests if the provisioning data has expired, or otherwise is determined to be stale, unreliable, and the like.

Upon receipt of the context request, the mobility management anchor computing device 106 can verify that the requested gateway computing device matches the list of one or more gateway computing devices the telecommunications-based device 102 can request. Additionally, the mobility management anchor computing device 106 queries the policy service 116 to determine whether the static provisioning maintained for the telecommunications-based device 102 and included in the telecommunications-based device 102 device should be overridden. As will be explained in greater detail below, the policy service 116 will utilize user subscription information or network policy information to determine whether to modify the static provisioning.

Turning now to FIG. 4C, the policy service 116 provides a response to the query to the mobility management anchor computing device 106. In one aspect, the query response can include a notification that the static provisioning should not be modified. In another aspect, the query response can include a notification that the static provisioning should be modified. Additionally, the query response can include the identification of a different, or alternative, gateway computing device. The mobility management anchor computing device 106 then processes the context communication request (either with the original identified gateway computing device or the alternative gateway computing device) to determine the network address of the appropriate gateway computing device identified in the context request. For example, the mobility management anchor computing device 106 can utilize the domain name service 110 to resolve the IP address of the identified gateway computing device. Once the mobility management anchor computing device 106 obtains the appropriate information, the mobility management anchor computing device forwards the context request to the appropriate gateway computing device to facilitate communications between the gateway computing device and the telecommunications-based device 102.

Figure 5:
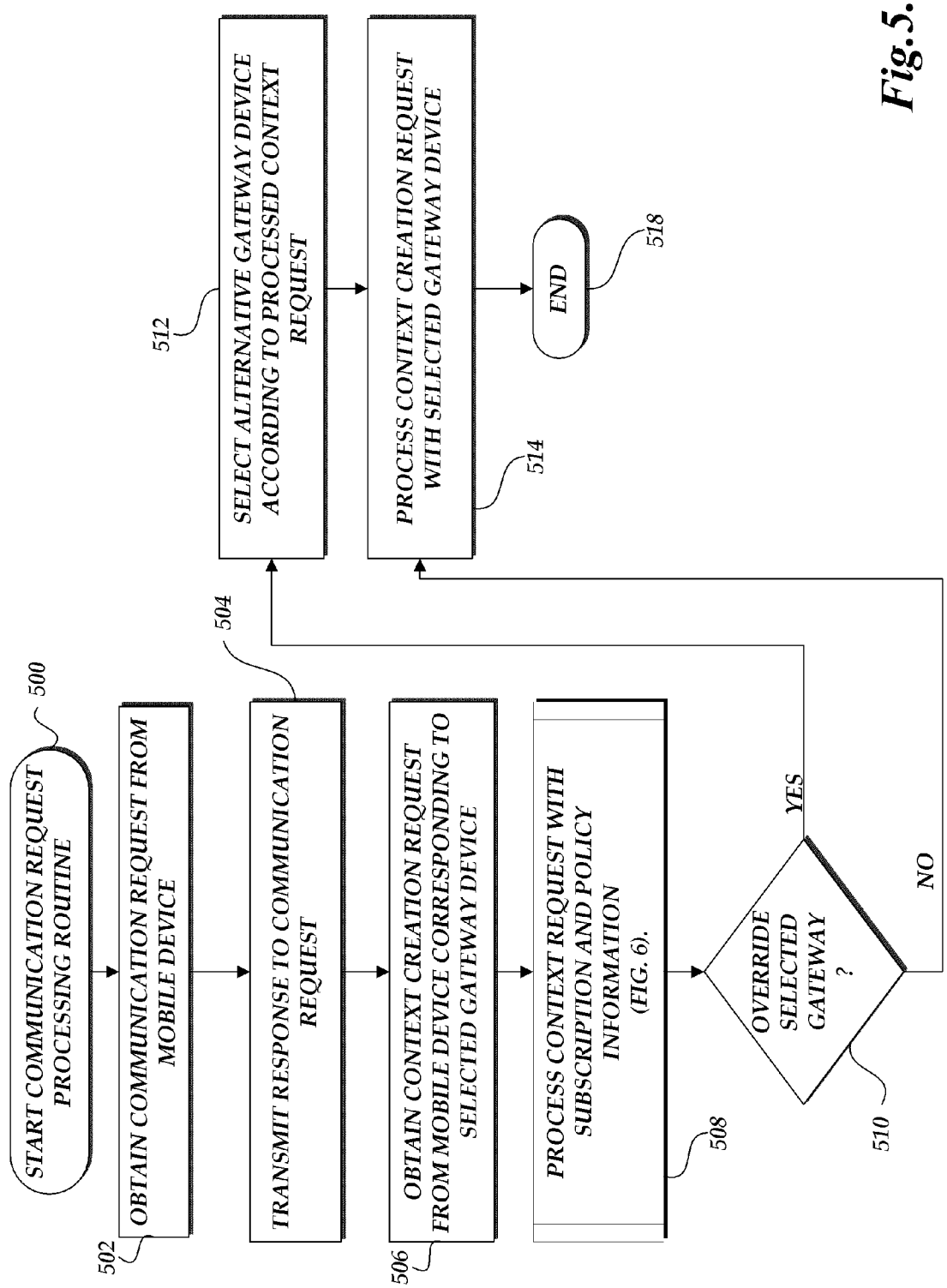
FIG. 5 is a flow diagram illustrative of a communication request processing routine implemented by a gateway computing device in a telecommunication environment.

Turning now to FIG. 5, a flow diagram illustrative of a communication request processing routine 500 implemented by a gateway computing device in telecommunication environment 100, such as the mobility management anchor computing device 106, will be described. At block 502, the mobility management anchor computing device 106 obtains a request to establish data communications from a computing device, such as telecommunications-based device 102 via the wireless communication network 104. For example, the request to establish data communications can correspond to an attach request transmitted from the telecommunications-based device 102.

The mobility management anchor computing device 106 processes the request to determine subscription information to be utilized in data communications with the requesting telecommunications-based device 102. In an illustrative embodiment, the subscription information includes the specification of one or more identifiers corresponding to a gateway computing device, such access gateway device 112, that are utilized in communications via the communication network 114. The processing of the request can also include the evaluation of security and authentication information. A request notification is transmitted to the requesting telecommunications-based device 102 at block 504. Illustratively, the request notification can include an acceptance or denial of the communication request. Alternatively, the mobility management anchor computing device 106 can also transmit additional information to the requesting telecommunications-based device 102 including, but not limited to, a portion of the subscription information.

At block 506, the mobility management anchor computing device 106 obtains a context creation request from the telecommunications-based device 102. Illustratively, the context creation request can include the specification of one or more gateway computing devices in which the context will be created. Illustratively, the one or more gateway computing devices can correspond to gateway devices identified, or otherwise configured, in the telecommunications-based device 102. Alternatively, the context creation request can omit the specification of any gateway computing device, as the information is maintained by the mobility management anchor computing device 106. At block 508, the mobility management anchor computing device 106 processes the context creation request and determines whether to modify/override the static provisioning provided in the subscription information. An illustrative sub-routine for processing the context request will be described with regard to FIG. 6, below. As previously discussed, the processing of the context creation request can be facilitated through the interaction with the policy service 116.

At decision block 510, a test is conducted to determine whether the results of the query are indicative that the static provisioning should be overridden. In an illustrative embodiment, the query result can correspond to a flag or other notification. If the static provisioning should be overwritten, at block 512, the mobility management anchor computing device 106 selects an alternative gateway device included in the query result returned from the policy service 116. Returning to decision block 510, if the static provisioning should not be modified (or overridden) or after an alternative gateway computing device has been identified at block 512, at block 514, the mobility management anchor computing device 106 processes the context creation request with the selected gateway device (either the original or alternative gateway device). As previously described, the processing of the context request by the mobility management anchor computing device 106 can include the determination of the network address of the appropriate gateway computing device identified in the context request. For example, the mobility management anchor computing device 106 can utilize the domain name service 110 to resolve the IP address of the identified gateway computing device. Additionally, the processing of the context request can include forwarding the context request to the appropriate gateway computing device to facilitate communications between the gateway computing device and the telecommunications-based device 102. At block 518, the routine 500 terminates.

Figure 6:
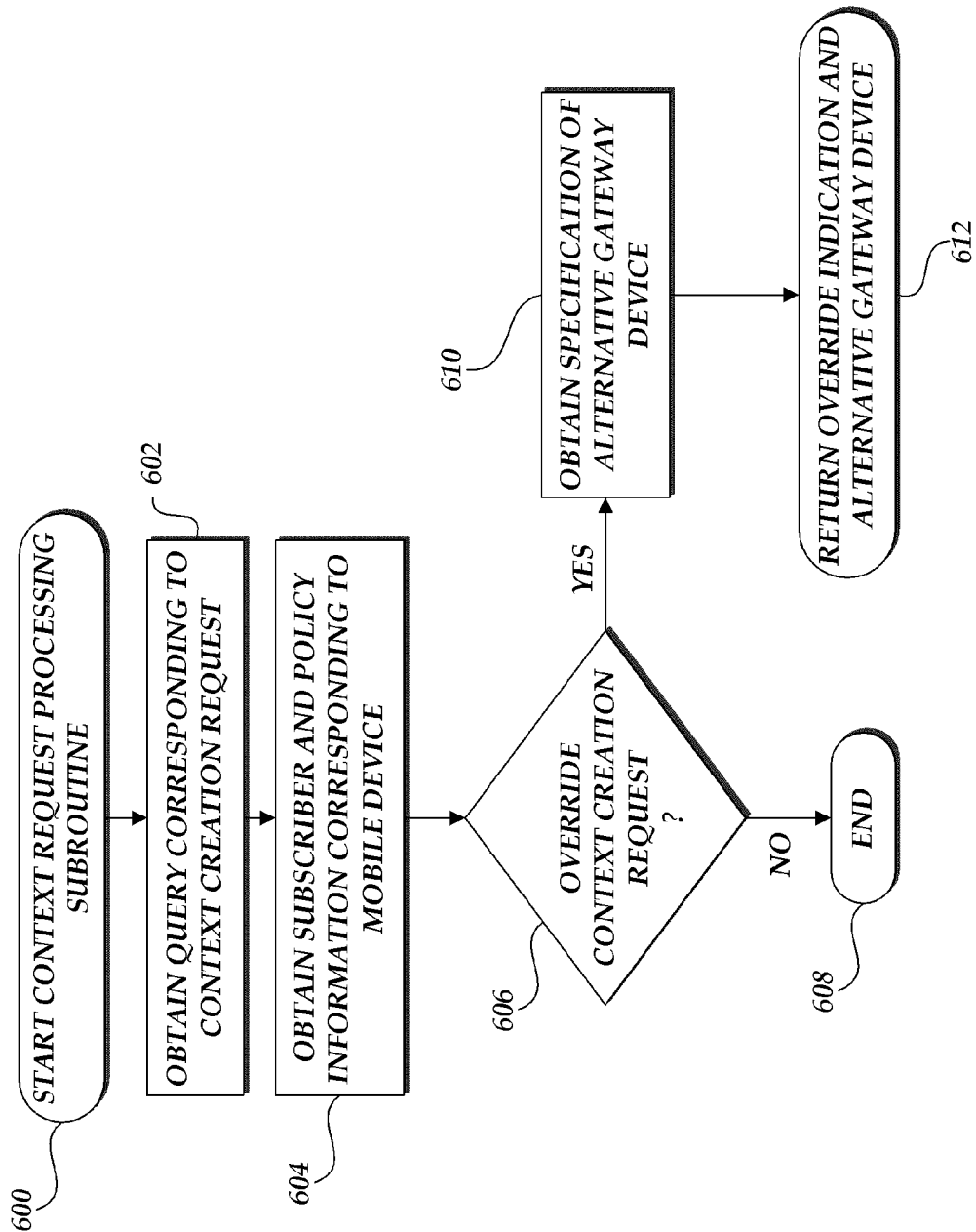
FIG. 6 is a flow diagram illustrative of a context request processing sub-routine implemented by a gateway computing device.

Referring now to FIG. 6, a flow diagram illustrative of a context request processing sub-routine 600 implemented by the mobility management anchor computing device 106, the policy service 116 or other gateway device will be described. At block 602, the policy service 116 obtains a query from the mobility management anchor computing device 106 corresponding to the context creation request transmitted by the telecommunications-based device 102. At block 604, the policy service 116 obtains subscription information and network policy information corresponding to the telecommunications-based device 102, or applicable to the telecommunications-based device. At decision block 606, a test is conducted to determine whether to modify/override the static provisioning information associated with the context request.

In an illustrative embodiment, the determination whether to modify/override the static provisioning information through data tables maintained by the policy service 116 or the mobility management anchor computing device 106. Specifically, in an illustrative embodiment, the data tables define whether to modify the static provisioning information based on subscription information associated with the telecommunications-based device 102. Illustratively, the subscription information defined in the tables can include telecommunications-based device 102 device type, roaming status (e.g., in home network vs. in visiting network), roaming plan (e.g., what is the home network and country associated with the telecommunications-based device 102), supported operating system, use descriptors (e.g., type of use, amount of data used, services consumed), supported applications or applications being executed by the telecommunications-based device 102, and the like. The subscription information can correspond to information that can assist in the optimization of the performance of the telecommunications-based device 102 or in the level service being provided to the user of the telecommunications-based device 102.

With continued reference to FIG. 6, if at decision block 606, the policy service 116 determines that the static provisioning information should not be modified, the sub-routine 600 terminates at block 608. Alternatively, if the policy service 116 determines that the static provisioning should be modified, at block 610, the policy service 116 obtains the specification on an alternative gateway computing device. In an illustrative embodiment, the data tables utilized to determine whether to modify the static provisioning may be utilized to identify one or more alternative gateway computing devices. At block 612, the alternative gateway computing devices are returned and the sub-routine 600 terminates.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing communication in a radio network, comprising:
   obtaining a communication request from a mobile device via the radio network;
   determining subscription information corresponding to the communication request from the mobile device, the subscription information including a static provision of at least one specified gateway computing device utilized to establish communications with the mobile device; and
   transmitting a response to the communication request to the mobile device;
   obtaining a subsequent communication request from the mobile device, the subsequent request corresponding to a request to initiate a communication context with the communication network in conjunction with the at least one specified gateway computing device;
   determining whether to select an alternate gateway computing device based on at least one of information associated with the mobile device and communication network policy information; and
   transmitting a request to establish a communication context to an alternative gateway computing device based on a determination select an alternate gateway computing device, wherein the mobile device does not establish a communication context with the specified at least one specified gateway computing device.

2. The computer-implemented method as recited in claim 1, wherein obtaining a subsequent communication request includes obtaining a subsequent communication request including a specification of a gateway computing device corresponding to the static provision of the least one specified gateway computing device.

3. The computer-implemented method as recited in claim 1, wherein obtaining a subsequent communication request includes obtaining a subsequent communication request including a specification of a gateway computing device corresponding to a separate configuration associated with the mobile device.

4. The computer-implemented method as recited in claim 1, wherein the information associated with the mobile device includes mobile device type information.

5. The computer-implemented method as recited in claim 1, wherein the information associated with the mobile device includes mobile device roaming status.

6. The computer-implemented method as recited in claim 1, wherein the information associated with the mobile device includes mobile device roaming plan.

7. The computer-implemented method as recited in claim 1, wherein the information associated with the mobile device includes subscribed service.

8. The computer-implemented method as recited in claim 1, wherein the information associated with the mobile device includes software application information.

9. The computer-implemented method as recited in claim 1, wherein the information associated with the mobile device includes use description.

10. The computer-implemented method as recited in claim 1, wherein determining whether select an alternate gateway computing device includes identifying the alternate gateway computing device.

11. A computer-implemented method for managing communications via a communications network, comprising:
    obtaining, at a first gateway computing device, a request to establish communications via the communication network;
    determining, by the first gateway computing device, information corresponding to a static provision of a second gateway computing device utilized to establish communications with the mobile device; and
    obtaining, by the first gateway computing device, a subsequent communication request from the mobile device, the subsequent request corresponding to a request to initiate a communication context with the communication network via the second gateway computing device; and
    determining, by the first gateway computing device, whether to select a third gateway computing device based on at least one of information associated with the mobile device,
    wherein the third gateway device is an alternate of the second gateway device and wherein the mobile device does not establish a communication context with the second gateway computing device.

12. The computer-implemented method as recited in claim 11, wherein obtaining a subsequent communication request includes obtaining a subsequent communication request including a specification of the second gateway computing device corresponding to the static provision of the second gateway computing device.

13. The computer-implemented method as recited in claim 11, wherein obtaining a subsequent communication request includes obtaining a subsequent communication request including a specification of the second gateway computing device corresponding to a separate configuration associated with the mobile device.

14. The computer-implemented method as recited in claim 11, wherein the information associated with the mobile device includes mobile device type information.

15. The computer-implemented method as recited in claim 11, wherein the information associated with the mobile device includes mobile device roaming status.

16. The computer-implemented method as recited in claim 11, wherein the information associated with the mobile device includes mobile device roaming plan.

17. The computer-implemented method as recited in claim 11, wherein the information associated with the mobile device includes subscribed service.

18. The computer-implemented method as recited in claim 11, wherein the information associated with the mobile device includes software application information.

19. The computer-implemented method as recited in claim 11, wherein the information associated with the mobile device includes use description.

20. The computer-implemented method as recited in claim 11, wherein determining whether to select a third gateway computing device includes identifying the third gateway computing device.

21. A system for managing communication in a communication network, comprising:
    a mobility management anchor component, executed on one or more computing devices having a memory and a processor, for obtaining communication requests from one or more mobile devices;
    one or more access gateways, executed on one or more computing devices having a memory and a processor, for facilitating communication between the one or more mobile devices that the communication network, wherein the mobility management anchor component statically provisions at least one access gateway to a mobile device based on an initial communication request; and
    a policy service, executed on one or more computing devices having a memory and a processor, for determining whether to transmit subsequent communication requests by the mobile device to an alternate gateway device based on at least one of subscription information and network policy information, wherein the mobile device does not establish a communication context with a specified gateway computing device identified in the initial communication request.

22. The system as recited in claim 21, wherein the subscription information includes mobile device type information.

23. The system as recited in claim 21, wherein the subscription information includes mobile device roaming status.

24. The system as recited in claim 21, wherein the subscription information includes mobile device roaming plan.

25. The system as recited in claim 21, wherein the subscription information includes subscribed service.

26. The system as recited in claim 21, wherein the subscription information includes software application information.

27. The system as recited in claim 21, wherein the subscription information includes use description.

28. The system as recited in claim 21, wherein the policy service is further operable to identify the alternative gateway computing device based on a determination to transmit subsequent communication requests to an alternate gateway device.

29. The system as recited in claim 21, wherein the mobility management anchor component is further operable to forward a context request to at least one of the statically provisioned access gateways or the alternate access gateways.

* * * * *